Dec. 30, 1941.  J. McELGIN  2,268,048
AIR CONDITIONING UNIT
Filed March 6, 1940
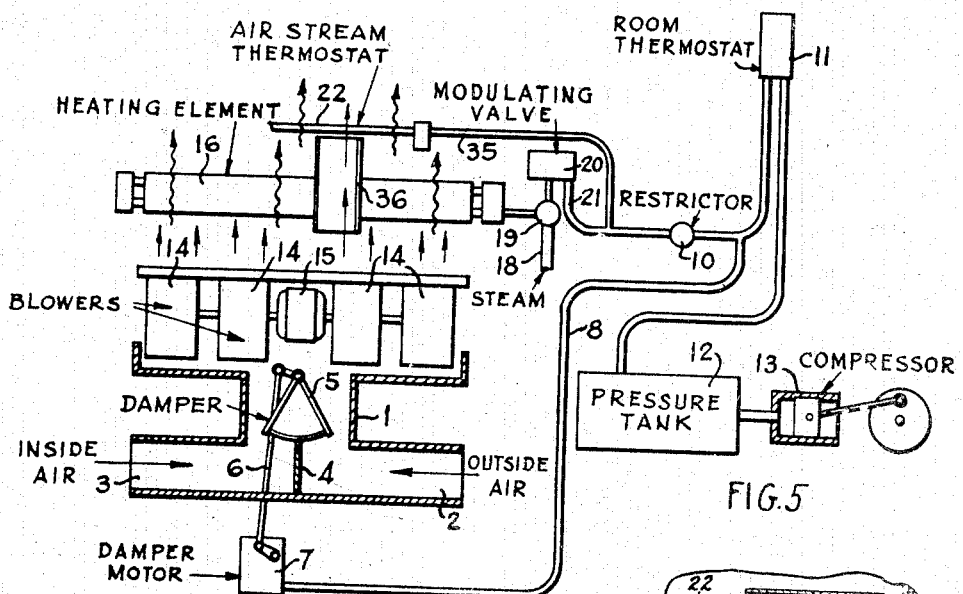
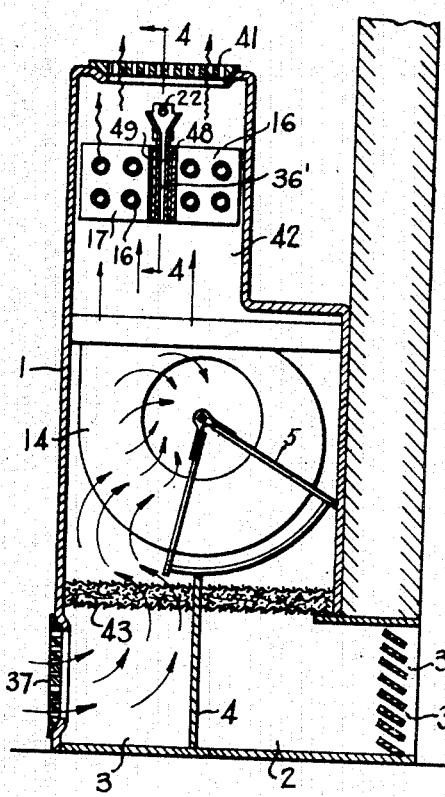
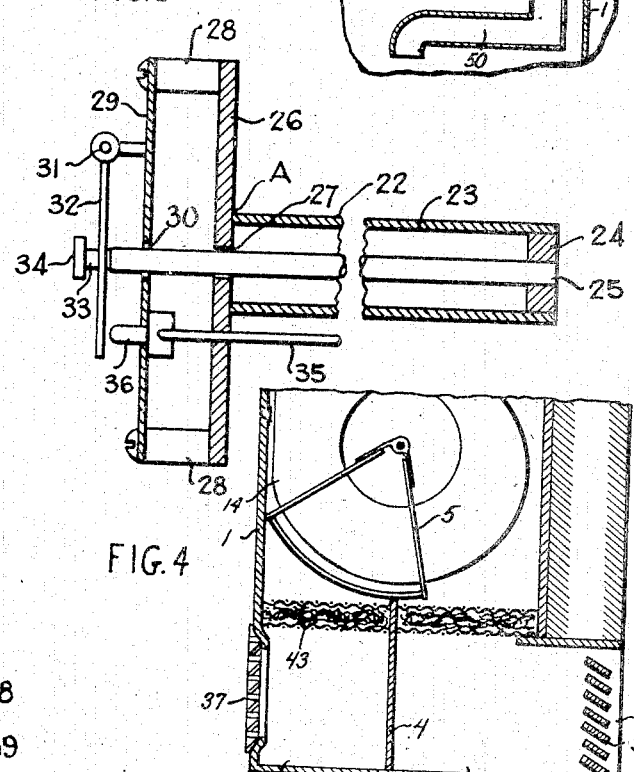
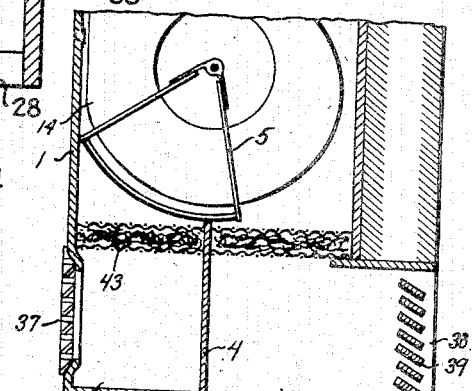
INVENTOR
JOHN McELGIN
BY Toulmin & Toulmin
ATTORNEYS Patented Dec. 30, 1941

2,268,048

UNITED STATES PATENT OFFICE 2,268,048

AIR CONDITIONING UNIT

John McElgin, Philadelphia, Pa., assignor to John J. Nesbitt, Inc., Philadelphia, Pa., a corporation of Pennsylvania Application March 6, 1940, Serial No. 322,555

5 Claims. (Cl. 236—37)

The present invention relates to a control means for ventilating and/or conditioning units.

In my Patent No. 2,216,350, issued Oct. 1, 1940, there is disclosed a control system for unit ventilators which effectively prevents drafts. It was pointed out in said application that, in order to prevent drafts, it is desirable to place a thermostat in the air stream coming from or traversing the casing containing the heat exchanger. In mild winter weather, a proper cooling effect could be obtained by introducing outside air at approximately 10 degrees less than the inside air, without causing cold drafts. As the weather gets colder, however, and the outside temperature decreases, a lesser need arises for the introduction of outside air for the sake of this cooling power, even though the room thermostat may occasionally demand it. Furthermore, if the cooling rate is too rapid, drafts may occur and cause complaints.

In order to overcome the annoying and detrimental effects of these drafts, there was provided, in accordance with the said invention, a readjustable thermostat arranged in the air stream traversing the heat exchanger casing. This thermostat was subjected to the control of an outside thermostat which automatically readjusts the control or operating point of the thermostat in an upward direction so that it operates at a higher inside temperature as the outside temperature falls. Aside from the reduced cooling effect thereby obtained, this also gives the additional advantage of the offsetting of the drooping effect of the wide differential air stream control necessitated to prevent hunting. The readjustable air stream thermostat was controlled by varying the air pressure in the fluid pressure control circuit in accordance with the outside temperature.

While a fluid pressure control circuit of this character operates satisfactorily, the control is exercised in an indirect manner. However, in accordance with the present invention, I have made a discovery which permits the operating point of the thermostat to be controlled directly by the outside temperature. Thus, it is not necessary to effect the control through the fluid pressure circuit, and to that extent, the changes in the outside temperature are reflected more accurately in the changes of the operating point of the thermostat.

The primary object of the present invention is to provide improved control means for ventilating and/or air conditioning units.

A more particular object is to provide a single air stream temperature control means for such units, together with improved means for automatically readjusting the control point of the thermostat upwardly as the outside temperature is reduced.

Another object is to provide apparatus and a method for controlling and readjusting the control points of the air stream control thermostats of a plurality of air conditioning units by subjecting the thermostats directly to both the indoor and outdoor temperatures, or at least to a combined indoor temperature and a temperature which changes in accordance with outdoor temperature.

A still further object is to provide a ventilating system in which the proportion of outdoor and indoor air is controlled more directly by the outdoor and indoor temperatures than in the prior-art systems, thus simplifying the apparatus as well as assuring additional positiveness of control.

A final object is to provide a ventilating system employing a thermostat for operating a damper, together with a simplified structure by which the thermostat regulates the indoor temperature with respect to the outside temperature in such a manner as to prevent drafts when the outside temperature decreases.

These objects are attained, in brief, by mounting a thermostat, not only in the air stream produced at the radiator but also in such a position as to be directly affected by the indoor and outdoor temperatures. Thus as the outdoor temperature decreases, the effect of this decrease in temperature controls or modifies the effects on the thermostat brought about by the indoor temperature.

In another aspect the invention contemplates the mixing together of the indoor and outdoor air, heating part of the mixed air and leaving the remainder of the mixed air unheated, but exposing the thermostat to both the heated mixed air and the unheated mixed air in order to control the heat source by which a greater heating effect is obtained as the temperature of the unheated mixed air decreases.

In a preferred embodiment the invention employs a fixed damper position so as to maintain a constant predetermined proportion of fresh air and recirculated air, and assuming that the room temperature is constant, the temperature of the mixed air becomes directly proportional to the outside temperature and therefore the general effect on the instrument (with proper adjustment) is the same as if all of the air came from outdoors.

Other objects and features will be apparent as the specification is perused in connection with the accompanying drawing.

Figure 1 is a diagrammatic view of a system which employs a thermostat improved in accordance with the present invention for regulating the proper proportions of outdoor air and indoor air. The figure shows an improved structure by which the control point of the thermostat is regulated in accordance with changes in the temperature of the outdoor air. The structure shown in this figure presupposes at least a definite amount of indoor or regulated air mixed with the outdoor air.

Figure 2 shows the application of the air conditioning unit, which is only diagrammatically indicated in Figure 1, to a practical installation. But this figure illustrates a modified arrangement from that shown in Figure 1 in that the damper has been moved to such a position as to admit all indoor air but to cut off all outdoor air. The present invention can be practiced with the damper in either of the two positions shown in Figures 1 and 2.

Figure 3 is a longitudinal view, partly in section, of a typical thermostat which may be employed in any of the foregoing arrangements or systems.

Figure 4 is a view similar to Figure 2 but in fragmentary form, showing the damper in its extreme left-hand position to admit all outdoor air in accordance with the principles of my invention.

Figure 5 is a modification of the structure by which the mixture of outdoor and recirculated air is presented directly to the thermostat.

Referring to the drawing in detail, and with reference particularly to Figure 1, the casing 1 of the air conditioning unit is provided with an outside air inlet opening 2 and an inside or a recirculated air inlet opening 3. These openings are separated by a wall or partition 4, and the sizes of the openings are controlled by means of a damper 5 which is actuated preferably through a link system 6 by a damper motor or engine 7 of any suitable and well-known type. The latter obtains its energy from the variations in pressure of a fluid, preferably air, which passes through a pipe 8.

The pipe 8 is connected to a room thermostat 11 and a tank 12. The latter is filled with air under constant pressure from a crank-operated compressor 13. As the fluid pressure in the pipe 8 varies due to the throttling effect of the room thermostat 11, the motor 7 swings the damper 5 about its pivot to change the relative proportion between the inside or recirculated air and the outside air being admitted to the casing.

In addition to the damper the casing may contain, entirely or in part, a blower system consisting of four centrifugal units 14 actuated by a common electrical motor 15. Thus, the mixture of inside and outside air, as determined by the position of the damper 5, is admitted to the eye of each blower and expelled or discharged through a suitably positioned peripheral passageway. As is well known, blowers of this type include a volute chamber which changes the axial direction of the air entering the eye of the blower into a tangential direction as the air leaves the discharge opening.

A source of heat 16, which may take the form of a steam radiator provided with transversely extending fins 17, is provided in the path of the air leaving the blower system. The arrangement is such that the air from the blowers passes between the walls of the radiator including spaces between the fins, and leaves the radiator in a heated condition. The radiator is provided with steam through a pipe 18 which contains an adjusting valve 19. The adjustment of the valve 19 is controlled by a so-called "modulating" valve 20, which is connected through a pipe 21 and a restrictor valve 10 to pipe 8 of the fluid system. The restrictor valve serves to permit pressure fluid from the pipe 8 to flow into the pipe 21 but substantially isolates the pressure variations in the pipe 8 from the pressure in pipe 21.

In order to control the pressure in the pipe 21 and the dependent radiator system there is provided an air stream thermostat, indicated at 22, which is disposed in the path of the air passing through the radiator. While a number of forms of thermostat may be used for this purpose, I prefer the type shown in detail in Figure 3.

As illustrated, the thermostat depends for its operation on the difference in heat expansion of two different metals, and this difference of expansion is translated into a change of pressure in the fluid system by permitting different amounts of fluid to escape from the system, depending on the intensity of heat to which the thermostat is exposed. One of these metals may comprise a sleeve 23 of brass, which is rigidly secured at one end by a disc 24 to a centrally disposed rod 25 of invar or any other suitable metal composition which has a different rate of heat expansion than brass. The brass cylinder 23 is rigidly secured at the end opposite from the disc 24 to a metal disc 26, which contains an opening 27 sufficiently large loosely to receive the rod 25. The disc 26 carries a plurality of spacers 28, to which is secured a metal plate 29. The latter also has a fairly large central opening 30, through which the rod 25 projects. A pivot member 31 is secured to the plate 29, this member carrying a bar 32. There is an opening (not shown) in the bar 32, which receives the shank portion 33 of a thumb screw 34 which is threaded into the end of the rod 25. A pipe 35 projects transversely through the disc 26, and terminates in a leakstat or nozzle 36. The latter has an opening (not shown) through which fluid contained in the pipe 35 can be emitted. The pipe is connected to the fluid system at the branch line 9, as indicated in Figure 1.

It is apparent that as the sleeve 23 is cooled by a lowering of the temperature of the air passing through the radiator 16 (Figure 1), the point A (Figure 3) moves to the right with respect to a point directly below on the rod 25. This is due to the contraction of the sleeve without a corresponding contraction on the part of the rod 25. As the sleeve moves to the right it carries with it, in the same direction, the disc 26 and the plate 29, which in turn, moves the pivot point 31 also to the right. The movement of the latter will cause the arm 32 to fulcrum about the left-hand end of the rod 25, causing the lower end of the bar 32 to move away from the nozzle 36. The greater the contraction of the sleeve 23 the farther away will be the lower end of the bar 32 from the left-hand end of the nozzle 36. It is apparent that an increased heating of the sleeve 23 will have the reverse effect and will cause the lower end of the bar 32 to move closer to the nozzle 36.

Assuming that the opening in the nozzle 36 has been uncovered by the removal of the bar 32 upon a contraction of the sleeve 23, air or other fluid is permitted to escape from the pipe 35 which has the effect of reducing the air pressure in the pipe 21 and also in the modulating valve. This reduction in pressure causes the valve 20 to open the steam valve 19 to supply the radiator 16 with steam.

The system to the left of the restrictor 10 is substantially independent of the system to the right of this element so that the pressure variations in the pipe 21 do not affect the damper motor 7. The latter is actuated by variations of pressure fluid flowing in the pipe 8 which is under the control of the thermostat 11.

In order to prevent the possibility of hunting, due to frequent changes in the inside or outside temperature, it is customary to provide the thermostat with a wide differential. In other words, the controlling effects are not exercised unless the changes in temperature become quite material. However, by providing a wide differential air stream control an undesirable drooping effect might be introduced in the temperature characteristics, and this gives rise, at least in part, to drafts and other inconveniences from the comfort standpoint.

In accordance with my prior invention, there is provided an automatic arrangement by which the control point of the thermostat is changed in response to a change of outdoor temperature so that neither a wide differential of adjustment is necessary at the thermostat, nor is any hunting effect introduced. This automatic adjustment is brought about by means of a bellows contained within the thermostat and serving to move the air nozzle or leakstat with respect to the pivoted arm in accordance with changes of outdoor temperature. An arrangement of this character operates satisfactorily, but in accordance with the present invention, I have found that the adjustment bellows is not necessary and that the control point of the thermostat can be changed by directly exposing a portion of the thermostat to the outdoor air, or at least to an unheated mixture of outdoor and indoor air.

The improvement is shown diagrammatically in Figure 1, in which a conduit or channel 36' is provided through the radiator 16 for presenting air directly from the blowers 14 to a portion of the thermostat 22. Thus, the thermostat is subjected to air which has passed through the radiator and thereby heated; also to air discharged at the blowers and which represents a mixture of the inside and outside air which has flowed past the damper 5. Thus one of the essential features of the present invention is to expose the thermostat partially to mixed air which has been heated by the radiator, and partially to unmixed air. The heated air tends to cause the brass member 23 (Figure 3) to expand and thus to move the arm 32 about its pivot toward the nozzle 36. The fluid pressure in the line is therefore increased, assuming a constant pressure in the tank 12. But the outside air or the mixture of the inside and outside air tends to cool that portion of the brass sleeve in the vicinity of the conduit 36' and this cooling effect causes the sleeve to contract.

As stated hereinbefore, a contraction of the sleeve moves the arm 31 away from the nozzle 36 and tends to reduce the fluid pressure in the control system by permitting fluid to escape at that point. Therefore, the actual movement of the arm 32 in regulating the fluid pressure in the control system is determined by the differential effects of the heated air on the one hand and the cool air mixture on the other hand. The colder the outside air becomes the greater is the cooling or compensation effect introduced at the thermostat, and the greater will be the change in the control point of the latter.

It can readily be seen that to offset the effect of the colder air striking a portion of the thermostat, the remaining portion must be heated to a greater degree. The rate at which the control point is thus changed is obviously dependent not only on the temperature of the outside air or on the degree of mixture of this outside air with the inside air, but also on the amount of air which is passed through the conduit 36' and strikes the thermostat. The relative lengths of the thermostat which are exposed to these various types of air also assist in the determination of the control point. These factors are adjusted to provide an increase in the control point of the thermostat as the temperature of the outside air decreases. The range over which the thermostat is adjusted will usually fall between 60 degrees and 75 degrees. Thus in mild weather a 60-degree low limit may prevail, while in weather of 20 degrees or below a 75-degree low limit might be used. Consequently, in very cold weather, for example 20 degrees or below, the compensatory effect on the thermostat produced by the outdoor air would cause the thermostat to operate the steam valve and the damper at the 75-degree low limit instead of the 60-degree limit. This advanced adjustment of the thermostat prevents the room temperature from becoming less than 75 degrees during cold weather and therefore precludes drafts.

In this manner the thermostat becomes self-compensating since the lower the temperature of the unheated air the higher must be the temperature of the heated air. Since the unheated air must, in any ventilating system, bear some relation to outside temperature, then the effect is automatically to increase the mixed air stream low limit temperature as the outside temperature falls, and conversely to decrease the mixed air low limit temperature as the outside temperature increases. The control therefore operates primarily on the steam valve.

While the damper 5 is adapted to be moved by the motor 7 to give any desired proportions to the indoor and outdoor air admitted to the air conditioning unit, I prefer, in accordance with the present invention, to so adjust the system, including fluid pressures and adjustments of the damper motor, in such a way that when the outside temperature is fairly low the damper will be caused to remain in a fixed predetermined position, and all the regulation of the unit is effected at the steam valve 19. In extremely low temperatures, the adjustment of the system may be such as to cause the damper to remain fixed in its extreme right-hand position as shown in Figure 2. However, in mild weather, the adjustment is such that most of the regulation, and in summertime, all of the regulation, is effected at the damper through the room thermostat and none at the steam valve. It is apparent that in cold weather, and assuming a fixed damper position and the desirability of maintaining a constant room temperature, the improved system will produce a temperature of the mixed air that is directly proportional to the outside temperature and therefore the general effect on the thermostat 22 is the same as if all of the air came from outdoors.

In view of the foregoing it is evident that the thermostat 22, while being connected to both the steam valve 19 and the damper 5, will during the major portion of the time and especially in cold weather, affect only the radiator, leaving the damper in a fixed position. Thus a higher low limit discharge temperature is obtained in cold weather than in mild weather. Any regulation of the damper can occur only in mild weather and this regulation is normally effected by the room thermostat. Expressed in still another way, the thermostat 22 is exposed to the heated mixed air and the unheated mixed air, and operates to control the heat source to obtain a greater heating effect as the temperature of the unheated mixed air decreases, and this purpose remains the same whether the air introduced is mixed air or all outdoor air.

To give an example of the principles expressed above and as pertaining to the operation of my improved unit, suppose that the inside air passes into the unit through the opening 3 at the rate of 1,000 cubic feet per minute, and the damper 5 remains in such a position as to admit fresh air through the opening 2 at the rate of 500 cubic feet per minute, making 1,500 cubic feet per minute of mixed air passing through the unit. Now supposing the temperature of the outside air drops from zero to —5 degrees; this change in temperature will affect the temperature of the mixed air $x$-degrees, i. e. the air immediately leaving the blowers 14 and before passing through the radiator.

But now assume that the outside temperature drops to —10 degrees, and the position of the damper 5 remains the same so as to admit to the unit the same relative proportions of indoor and outdoor air. In that case the temperature of the mixed air will be reduced by an amount in degrees twice as much as before; in other words, $2x$ degrees. Similarly, if the outside temperature is reduced to —15 degrees, the change in temperature of the mixed air is three times the change as was caused when the outside temperature dropped to —15 degrees. Thus this change is $3x$ degrees. It will therefore be apparent that under the conditions of a fixed damper, the changes in the temperature of the mixed air are directly proportional to the changes in temperature of the outside air notwithstanding the admission of inside air to the mixed air. It has been pointed out that a portion of the thermostat 22 is exposed directly to the mixed air as it leaves the blowers, so that the thermostat is in a position to respond and therefore to exert a control of the radiator 16 in accordance with the changes of the outside temperature.

Figure 2 shows one practical way in which the improvement may be carried out, and in which the damper is shown swung all the way to its righthand position so as entirely to close off all of the outdoor air but to admit all indoor air. This is a condition normally met with in very cold weather. The air conditioning unit in this case is applied in a position in which the outdoor air inlet is located near the bottom of the wall of the building. The casing 1 may take the general form of a rectangular metal box having a recirculated air inlet 37 near the bottom of the box, and an outdoor air inlet 38 near the bottom of the box at the bottom of the wall of the building. The air inlet 37 is provided with a grill, and the opening 38 is provided with inclined louvers 39. The box at the end opposite the opening 37 is provided with grill openings indicated at 41 for the egress of the air.

The casing 1 is provided with a portion 42 of less width than the main portion, and within this portion of the box there is contained the radiator 16 having a heat insulated passageway 36' extending through the middle of the radiator, as in the case of Figure 1. The thermostat 22 is supported across the top of the radiator in such a way that a portion of the thermostat is directly in the path of the air which passes through the radiator, and another portion is exposed to the unheated air which passes through the opening 36'. The main portion of the box 1 contains the centrifugal blowers 14, and pivoted on the axis of these blowers is the damper 5, which in the case of Figure 2 is shown as having moved all the way to its right-hand position. Between the arcuate portion of the damper 5 and the lowermost part of the box 1 there is a filter 43, which for convenience is shown as extending over the whole width of the box, but since the damper has assumed a position so as to prevent any outdoor air from passing up through the unit, only the left-hand part of the filter is employed to remove dust or other impurities from the air entering the inlet opening 37. A partition 4 is provided between the inlet 37 and the opening 38, as in the case of Figure 1.

Assuming that the damper is in the position shown in Figure 2, indoor air is caused to move through the opening 37, past the filter 43, into the eye of the fans 14 and centrifugally expelled by the latter to flow through the radiator 16 and the passageway 36', out through the openings 41. A definite and predetermined proportion of the indoor air entering the opening 37 is heated by the radiator so that the thermostat 22 is exposed in part to the heating effects of this heated air and also to the cooling effects of the unheated air which passes through the passageway 36'.

Assuming that the thermostat 22 is connected in a fluid pressure system similar to Figure 1, and further assuming that the outside temperature is fairly low, as in wintertime, the system is so adjusted, particularly the adjustments at the damper motor and at the steam valve 19, also the pressure of the system, that any net change in temperature indicated by the thermostat will immediately cause a corresponding change to take place at the steam control valve 19 but without disturbing the position of the damper.

It will be understood that in the summertime when the outdoor temperature is quite high the fluid system will be readjusted in such a way as to have the room thermostat 11 take over practically the entire controlling effects to operate the damper 5, with no control at all of the steam valve 19. In the case of extremely high outside temperatures the damper 5 will be swung all the way over to its extreme left-hand position, admitting only fresh or outdoor air to the casing 1. This condition is shown in Figure 4. It is obvious that no steam will be passed through the radiator under these conditions because the function of the unit 1 is to introduce as much cool air as possible from the outside, and if necessary, to supplement this cooling effect by introducing brine or other cooling medium through the pipes of the radiator. If an additional or supplementary cooling effect is employed, the fluid pressure system, including the damper motor and the control valve 19, may be so adjusted as to have the thermostat 22 share the control with the room thermostat so as not only to move the damper 5 to its extreme left-hand position but at the same time to open the valve 19 as wide as possible in order to introduce the greatest amount of cooling medium into the radiator.

I have explained the operation of the structure shown in Figures 2 and 4 by taking two extreme cases. In one case the outside temperature is quite low, calling for the movement of the damper 5 to its extreme right-hand position, and the control of the thermostat is exercised practically entirely on the steam valve. In the second case the outside temperature is fairly high, in which case the damper 5 is moved to its extreme left-hand position by the thermostat 22, and little or no control is exercised at the steam valve 19 (unless brine or other cooling medium is introduced into the radiator). However, it will be understood that the usual position of the damper will be intermediate these extreme positions, and assuming that the temperature of the room is constant, so that there is no variation in the room thermostat 11, the damper will remain in a fixed position, leaving the sole control in the thermostat which operates on the steam radiator.

As was pointed out in connection with Figure 1, when it is desired to provide a constant room temperature and therefore a constant temperature of the air mixture leaving the unit, any tendency for the temperature of the mixture to change is directly proportional to the outside temperature, and therefore the general effect on the thermostat is the same as if all of the air came from outdoors. Thus notwithstanding the fact that a definite proportion of indoor air is admitted to the casing, the control exercised by the thermostat at the radiator valve 19 is precisely the same as if no indoor air were admitted to the casing, but all outdoor air were admitted. It will be therefore seen that the necessary changes in temperature brought about by either an increase or a decrease of heat emitted by the radiator is strictly proportional, in the inverse sense, to the changes in the outdoor temperature. Accordingly, the temperature of the air which leaves the improved air conditioning unit will deviate less from the assigned constant temperature than the units on the market, since the changes in the heating effects caused by the thermostat at the valve 19 correspond accurately and follow instantaneously the changes in temperature of the outdoor air. This desirable result is brought about, as explained hereinbefore, by preferably maintaining a constant proportion between the indoor and outdoor air, due to a fixed position of the damper 5. The latter is not controlled by the thermostat as in the application referred to hereinbefore but instead, by a room thermostat which does not tend to change often.

While I have shown and described the feature of operating the damper from the room thermostat, it is obvious that any other control may be exercised for this purpose. Thus, it is entirely possible to operate the damper manually when occasion requires but it will be understood, the position of the damper is changed only on extreme occasions, leaving most of the control of temperature conditions within the casing to the thermostat which operates on the steam radiator.

Figure 5 shows a modified structure by which the mixed unheated air delivered by the blowers 14 is directed around the radiator 16 through a conduit 50 in order to cool a portion of the thermostat 22. In some installations, such an arrangement may offer an advantage over that structure in which the mixed air is passed through a conduit 36 positioned within the radiator.

It will be understood that I desire to comprehend within my invention such modifications as come within the scope of the claims and the invention.

Having thus fully described my invention, what I claim as new and desire to secure by Letters Patent, is:

1. An air conditioning unit comprising a casing containing an adjustable source of heat and having openings which admit a fixed proportion of recirculated air and fresh air to the unit, fan means in said casing for mixing the recirculated and fresh air and for forcing the mixed air through said source of heat, a thermostat for changing the amount of heat radiated by said source, and a heat insulated by-pass of the source of heat through which the unheated air mixture passes to the thermostat, said thermostat being presented in part to the heated air mixture after the latter leaves the source of heat and in part to the air mixture before the latter is subjected to the source of heat after leaving the fan.

2. An air conditioning unit for an inclosure comprising an adjustable source of heat, a damper which admits outdoor and recirculated air to said unit, means for mixing said outdoor and recirculated air, a thermostat one part of which is exposed to the heated mixed air and another part of which is exposed to the unheated mixed air, a heat insulated by-pass of the source of heat through which the unheated air mixture passes to the thermostat, and connections between the thermostat and heat source for regulating the heat source in terms of the composite temperature of the heated mixed air and unheated mixed air, and a thermostat positioned remote from the unit but within said inclosure for regulating the position of the damper in order to control the proportion of outdoor and recirculated air admitted to the unit.

3. An air conditioning unit for a room comprising a heat radiator controlled by a fluid-operated valve, a damper which admits outdoor and recirculated air to said unit, a fluid-operated motor for actuating said damper, fan means for mixing said outdoor and recirculated air, a thermostat one part of which is exposed to the mixed air after it passes through said radiator and another part of which is exposed to the mixed air before passing through said radiator, a heat insulated by-pass of the radiator through which the unheated air mixture passes to the thermostat, a conduit containing fluid under pressure connected between the thermostat and the valve of the radiator for regulating the radiated heat in terms of the composite temperature of the heated mixed air and the unheated mixed air, a room thermostat positioned remote from the unit but within said room, and a conduit containing fluid under pressure connected between said room thermostat and the damper motor for regulating the position of the damper in accordance with the room temperature in order to control the proportion of outdoor and recirculated air admitted to the unit.

4. An air conditioning unit for a room comprising an adjustable source of heat, a damper which admits outdoor and recirculated air to said unit, means for mixing said outdoor and recirculated air, a thermostat one part of which is exposed to the heated mixed air and another part of which is exposed to the unheated mixed air, a heat insulated by-pass of the source of heat through which the unheated mixed air passes to the thermostat, and connections between the thermostat and heat source for regulating the heat source in terms of the composite temperature of the heated mixed air and unheated mixed air, and a room thermostat positioned remote from the unit but within said room for regulating the position of the damper in order to control the proportion of outdoor and recirculated air admitted to the unit, said first-mentioned thermostat being adjusted entirely to control the temperature of the unit in relatively cold weather by varying the heat source in accordance with the temperature of the outdoor air, and said room thermostat being adjusted entirely to control the temperature of the unit in relatively mild weather by varying the position of the damper in accordance with the room temperature.

5. An air conditioning unit for a room, an adjustable source of heat, a damper which admits outdoor and recirculated air to said unit, means for mixing said outdoor and recirculated air and for subjecting the mixed air to the source of heat, a thermostat one part of which is exposed to the heated mixed air and another part of which is exposed to the unheated mixed air, a heat insulated by-pass of the source of heat through which the unheated mixed air passes to the thermostat and connections between the thermostat and heat source for regulating the heat source in terms of the composite temperature of the heated mixed air and unheated mixed air, said thermostat being adjusted entirely to control the temperature of the unit in relatively cold weather by varying the heat source in accordance with the temperature of the outdoor air and employing a fixed position of damper whereby the variations in temperature of the mixed air to which the thermostat is subjected represent variations in the temperature of the outdoor air so that the temperature of the room is controlled as a direct function of the temperature of the outdoor air.

JOHN McELGIN.